D. Perry,
Windlass Water Elevator.
N° 43,862. Patented Aug. 16, 1864.
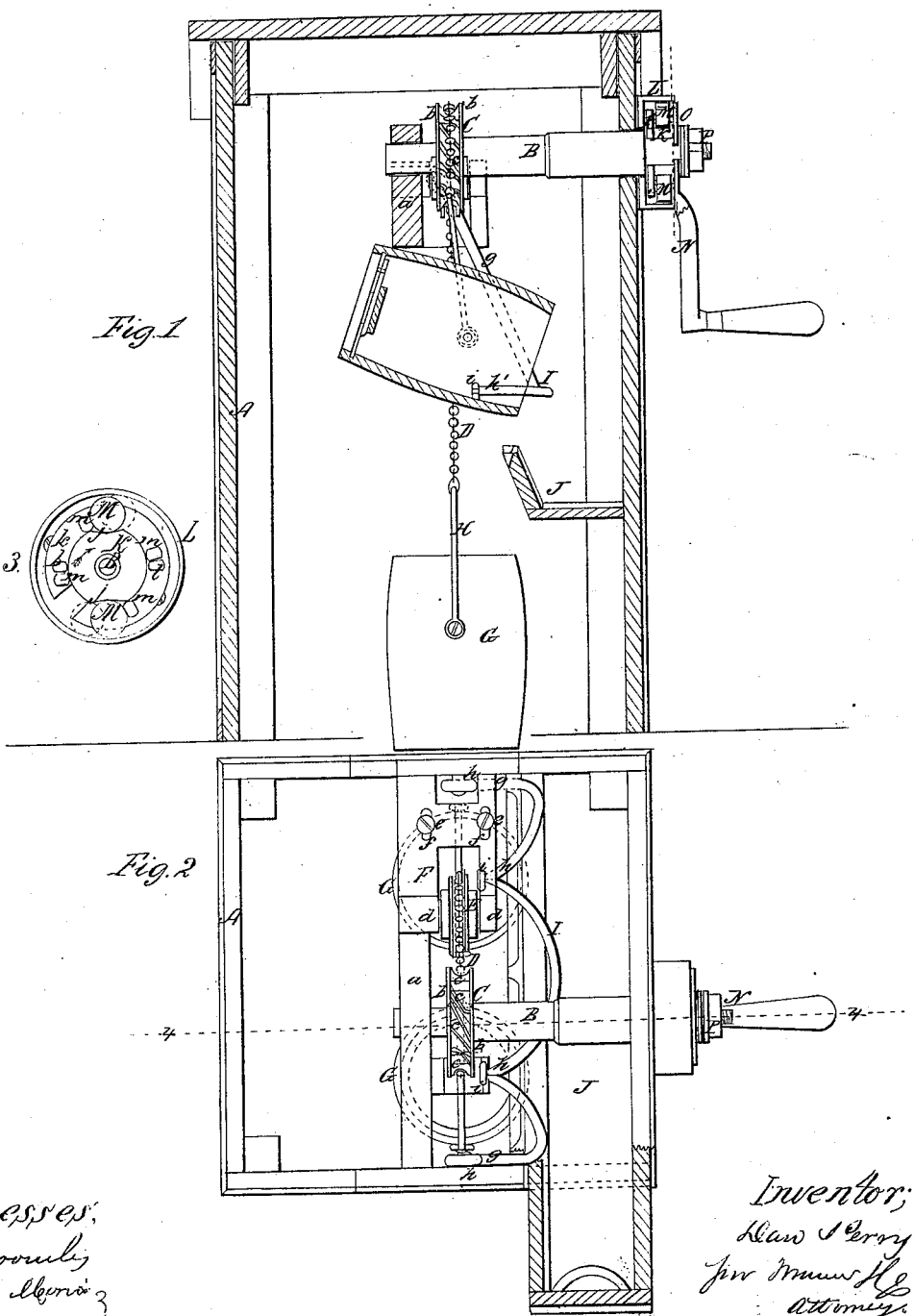

UNITED STATES PATENT OFFICE.

DAN PERRY, OF PAWTUCKET, RHODE ISLAND.

IMPROVEMENT IN WATER-ELEVATORS.

Specification forming part of Letters Patent No. 43,862, dated August 16, 1864.

*To all whom it may concern:*

Be it known that I, DAN PERRY, of Pawtucket, in the county of Providence and State of Rhode Island, have invented a new and Improved Water-Elevator; and I do hereby declare that the following is a full, clear, and exact description of the same, reference being had to the accompanying drawings, making a part of this specification, in which—

Figure 1 is a side sectional view of my invention, taken in the line $x\,x$, Fig. 2; Fig. 2, a plan or top view of the same; Fig. 3, a section of the driving-crank mechanism, taken in the line $y\,y$, Fig. 1.

Similar letters of reference indicate corresponding parts in the several figures.

This invention relates to a new and improved water-elevating device for drawing water from wells designed for domestic or household purposes.

The invention consists, first, in a novel construction of the pulley over which the chain or rope of the buckets passes, as hereinafter fully shown and described, whereby the chain or rope is effectually prevented from slipping on the pulley.

The invention consists, secondly, in the employment or use of a supplemental pulley arranged in such relation with the principal pulley as to cause the two buckets to rise and fall in the well and pass each other without coming in contact.

The invention consists, thirdly, in an improved stop mechanism applied to the crank or windlass for the purpose of retaining or holding a bucket at any height in the well.

The invention consists, fourthly, in an improvement in the bucket-tripping device, whereby the buckets are prevented from being injured by abrasion.

To enable those skilled in the art to fully understand and construct my invention, I will proceed to describe it.

A represents a well-curb, which may be of rectangular or other suitable form; and B, is a shaft placed horizontally in the upper part of the curb, the inner end of said shaft having its bearing in a cross-bar, $a$, in the curb. On the shaft B there is placed and firmly keyed a pulley, C, composed of two disks, $b\,b$, connected near their peripheries by oblique plates $c$, as shown in Figs. 1 and 2. These plates $c$ are placed at different distances apart, and they are concave at their outer edges, so as to form a groove for the bucket chain or rope to work in.

In consequence of having the plates $c$ in an oblique position, it will be seen that an acute angle is formed at one side of each plate at its junction with each disk $b$, and in turning the pulley C the bucket chain or rope will, in consequence of the obliquity of the plates $c$, be pressed or forced over to one of the disks, $b$, according to the direction in which the pulley is turned, and will be caught or held by the acute angles between the plates $c$ and disks $b$, and effectually prevented from slipping. The plates $c$ are placed at different distances apart, in order that chains having different-sized links may be use. In the drawings, a chain, D, is represented, but a rope may be used, if desired. In addition to this pulley C, I employ a pulley, E, of smaller diameter, over which the chain D also passes. This pulley E has its bearings $d$ on a plate, F, which is placed on the bar $a$ and secured thereto by set-screws $e$, which pass through oblong slots $f$ in the plate F. By this arrangement the pulley E may be adjusted nearer to or farther from C, as may be required. There are two buckets, G G, used, one attached to each end of the chain D, and the object of the pulley E is to prevent the two buckets from coming in contact as they pass each other. Thus I am enabled to use a pulley, C, of moderate diameter.

The buckets G G may be of the usual or any proper form and have each a bail, H, attached to which the ends of the chain D are connected.

I represents the bucket-tripping device, which is composed of a rod or bar bent so as to form two arms, $g\,g$, one at each side of the curb A, and fitted on pins $h$, so as to swing freely thereon. The portion of the rod or bar which connects the arms $g\,g$ is bent so as to form two projections, $h'\,h'$, on the end of each of which there is placed a friction roller, $i$. When a filled bucket is raised, it strikes the projection $h'$ above it, and is consequently tilted, and its contents discharged into a trough, J, at the front of the curb. It frequently happens that a filled bucket in coming in contact with the tripping device will not be presented properly to it, the bail will occasionally strike the projection $h'$, and, in order to prevent abrasion of the buckets from this cause, the friction-rollers $i$ are employed, which have a tendency to ward off the buckets and rotate as the buckets move in contact with them, so that the buckets will not be injured. On the outer end of the shaft B there is keyed a cam, K, having a recess or indentation, $j$, at two opposite points of its periphery, as shown in Fig. 3. This cam K has a flange, $k$, at its inner edge, which is provided with two pins, $l\ l$, projecting from it at opposite sides of its center. The cam K is encompassed by a cylindrical box, L, which is attached to the curb A, concentric with the cam, a space being allowed between the periphery of the cam and the box L to receive two rollers, M M, which are fitted in the indentations $j\ j$, between them and the box L, as shown in Fig. 3.

N represents a crank attached to a circular plate, O, which is fitted loosely on the outer end of the shaft B, and is provided with four pins, $m$, at equal distances apart, said pins projecting within the box L, one being at one side of each roller M, in contact with it, and one in contact with each pin $l$ of the flange $k$ of the cam K, as shown in Fig. 3, the arrow 1 indicating the direction in which the shaft B is being turned. The plate O is retained on the shaft B by a nut, P, and it will be seen that by turning the crank N in the direction indicated by the arrow 1, motion will be communicated to the shaft B through the medium of the two pins $m\ m$ of the plate O, which are in contact with the pins $l\ l$ of the flange $k$, the pins $m\ m$ of the plate O, which are in contact with the rollers M, keeping the latter in proper position or in the indentations $j$ while rotating with the cam K.

From the above description it will be seen that if the crank N be released at any time when a bucket is partially raised the bucket cannot descend by a reverse movement of the shaft B, as the rollers M will bind between the cam K and the side of the box L, as indicated in red in Fig. 3. At the same time the shaft B may be turned in either direction through power applied to the crank N.

Having thus described my invention, what I claim as new, and desire to secure by Letters Patent, is—

1. The pulley C, provided with or composed of oblique plates $c$, fitted between disks $b\ b$, arranged to operate upon the bucket chain or rope in the manner substantially as and for the purpose set forth.

2. The adjustable supplemental pulley E, arranged to operate in connection with the pulley C, substantially as and for the purpose set forth.

3. The stop or bucket-retaining mechanism, composed of the cam K on the shaft B, the stationary cylindrical box L, attached to the curb concentrically with the shaft B, the rollers M, interposed between the cam and the box, the pins $l\ l$ on the flange $k$ of the cam, and the pins $m$ on the plate O of the crank N, all arranged to operate substantially as set forth.

4. The friction-roller $i$, placed on the ends of the projections $h'\ h'$, for the purpose herein specified.

DAN PERRY.

Witnesses:
ROYAL LEE,
ORIN F. PERRY.